United States Patent
Small et al.

(10) Patent No.: US 8,539,491 B1
(45) Date of Patent: Sep. 17, 2013

(54) THREAD SCHEDULING IN CHIP MULTITHREADING PROCESSORS

(75) Inventors: Christopher A. Small, Cambridge, MA (US); Daniel S. Nussbaum, Cambridge, MA (US); Alexandra Fedorova, Lincoln, MA (US)

(73) Assignee: Oracle America, Inc., Redwood City, CA (US)

( * ) Notice: Subject to any disclaimer, the term of this patent is extended or adjusted under 35 U.S.C. 154(b) by 1830 days.

(21) Appl. No.: 10/898,759

(22) Filed: Jul. 26, 2004

(51) Int. Cl.
*G06F 9/46* (2006.01)

(52) U.S. Cl.
USPC .......................................................... 718/102

(58) Field of Classification Search
USPC .......................................................... 718/102
See application file for complete search history.

(56) References Cited

U.S. PATENT DOCUMENTS

| | | | | |
|---|---|---|---|---|
| 5,301,302 A * | 4/1994 | Blackard et al. | | 703/20 |
| 5,353,418 A * | 10/1994 | Nikhil et al. | | 718/108 |
| 5,488,713 A * | 1/1996 | Norton et al. | | 703/22 |
| 5,715,457 A * | 2/1998 | Wakatani | | 718/105 |
| 5,923,872 A * | 7/1999 | Chrysos et al. | | 712/244 |
| 7,155,600 B2 * | 12/2006 | Burky et al. | | 712/229 |
| 7,155,721 B2 * | 12/2006 | Safford et al. | | 718/104 |
| 2004/0111509 A1 * | 6/2004 | Eilam et al. | | 709/224 |
| 2005/0081183 A1 * | 4/2005 | Accapadi et al. | | 717/100 |
| 2006/0020775 A1 * | 1/2006 | Madriles et al. | | 712/235 |

OTHER PUBLICATIONS

Exploring Efficient SMT Branch Predictor Design Ramsay, Feucht, Lipasti Workshop on Complexity-Effective Design, in conjunction with ISCA, Jun. 2003.*
Power-conscious Joint Scheduling of Periodic Task Graphs and Aperiodic Tasks in Distributed Real-time Embedded Systems Luo et al. IEEE, 2000.*

* cited by examiner

*Primary Examiner* — Mengyao Zhe
(74) *Attorney, Agent, or Firm* — Osha Liang LLP

(57) ABSTRACT

A thread scheduling technique for assigning multiple threads on a single integrated circuit is dependent on the CPIs of the threads. The technique attempts to balance, to the extent possible, the loads among the processing cores by assigning threads of relatively long-latency (low CPIs) with threads of relatively short-latency (high CPIs) to the same processing core.

9 Claims, 11 Drawing Sheets

| | Core 1 | Core 2 | Core 3 | Core 4 |
|---|---|---|---|---|
| (a) | 1, 6, 11, 16 | 1, 6, 11, 16 | 1, 6, 11, 16 | 1, 6, 11, 16 |
| (b) | 1, 6, 6, 6 | 1, 6, 11, 11 | 1, 11, 11, 16 | 1, 16, 16, 16 |
| (c) | 1, 1, 6, 6 | 1, 1, 6, 6 | 11, 11, 11, 11 | 16, 16, 16, 16 |
| (d) | 1, 1, 1, 1 | 6, 6, 6, 6 | 11, 11, 11, 11 | 16, 16, 16, 16 |

|     | Core 1         | Core 2         | Core 3          | Core 4           |
| --- | -------------- | -------------- | --------------- | ---------------- |
| (a) | 1, 6, 11, 16   | 1, 6, 11, 16   | 1, 6, 11, 16    | 1, 6, 11, 16     |
| (b) | 1, 6, 6, 6     | 1, 6, 11, 11   | 1, 11, 11, 16   | 1, 16, 16, 16    |
| (c) | 1, 1, 6, 6     | 1, 1, 6, 6     | 11, 11, 11, 11  | 16, 16, 16, 16   |
| (d) | 1, 1, 1, 1     | 6, 6, 6, 6     | 11, 11, 11, 11  | 16, 16, 16, 16   |

THREAD SCHEDULING IN CHIP MULTITHREADING PROCESSORS

BACKGROUND OF INVENTION

In a typical computer network, a server computer 10 services requests from and provides data to client computers 12, 14, 16, 18 that are connected to the server computer 10 over a network (e.g., the Internet) 20. The server computer 10 may be used to store data, programs, etc. for use by the client computers 12, 14, 16, 18. Those skilled in the art will recognize that the server computers 10 may also be used to manage and control the client computers 12, 14, 16, 18.

In one example, an internet-based business may operate a server (or servers) to handle customer requests initiated at computer terminals located potentially thousands of miles away from the business's server(s). Each time a customer accesses the website of the business, an independent set of software instructions, i.e., a "thread," is executed by a processor of the business's server(s) to provide requested data to the customer.

In order to better meet increased networking demands, the "server" side of the client-server model shown in FIG. 1 may be implemented using any one of a variety of designs. For example, in FIG. 2, a "server" side of a computer network is implemented using server 30, 32 that each having a single processor 34, 36, respectively. Each single processor 34, 36 is capable of executing one thread at a time. Thus, the "server" side in FIG. 2 is capable of executing two threads at a time for the client computers 38, 40, 42, 44 connected to the servers 30, 32 over network 46. If a third thread is initiated while each of the processors 34, 36 is executing a thread, one of the threads being executed by the processors 34, 36 may be blocked in order to allow the third thread to be executed (dependent on, for example, priority of the third thread). Alternatively, the third thread may be forced to wait until one of the processors 34, 36 completes executing its respective thread.

In another type of design, for example, as shown in FIG. 3, a "server" side of a computer network is implemented using a server 50 that has a multithreaded processor 52. The multithreaded processor 52 maintains the execution context of a plurality of threads. Thus, if the multithreaded processor 52 supports the execution of x threads at a time, the multithreaded processor 52 may rapidly switch between x threads for the client computers 54, 56, 58, 60 connected to the server 50 over network 62. When a thread being executed by the multithreaded processor 52 stalls due to, for example, waiting for data from memory, the multithreaded processor 52 may rapidly switch to another thread and execute instructions from that thread.

In another type of design, for example, as shown in FIG. 4, a "server" side of a computer network is implemented using a multiprocessor server 70. The multiprocessor server 70 has a plurality of processors 72, 74, 76, 78 that are each capable of executing one thread at a time. Thus, in FIG. 4, the multiprocessor server 70 is capable of executing four threads in parallel for the client computers 80, 82, 84, 86 connected to the multiprocessor server 70 over network 88. Those skilled in the art will recognize that a symmetric multiprocessing (SMP) system is a type of multiprocessing system in which multiple threads may be executed in parallel. Although typical SMP processors only process one thread at a time, the greater number of processors in the SMP system relative to that of a non-multiprocessing system increases the number of threads that are executable in a given period of time.

In another type of design, for example, as shown in FIG. 5, a "server" side of a computer network is implemented using a multiprocessor server 90 that has a plurality of multithreaded processors 92, 94, 96, 98. Thus, if each of the four multithreaded processors 92, 94, 96, 98 is capable of executing x threads at a time, the multiprocessor server 90 is capable of executing 4x threads at a given time for the client computers 100, 102, 104, 106 connected to the multiprocessor server 90 over network 108.

The execution of a software thread in any one of the types of processors described above with reference to FIGS. 2-5 occurs in a part of the processor known as the "core" (referred to and known in the art as "processing core"). The processing core is formed of a hardware execution pipeline and functional units (e.g., arithmetic units and load/store units) that actually perform the execution of a software thread.

In the case of a multithreaded processor as described above with reference to FIGS. 3 and 5, when there are more threads ready to run than there are execution contexts available, a scheduler, typically part of the operating system, selectively assigns some number of threads to a processing core of the multithreaded processor. Such a multithreaded processing core interleaves execution of instructions from multiple threads, potentially switching between contexts (i.e., switching between threads) on each cycle. A thread may become blocked when the thread encounters a long-latency operation, such as, for example, servicing a cache memory miss. When one or more threads are unavailable, the multithreaded processing core continues to switch among the remaining available threads. Those skilled in the art will recognize that for multithreaded workloads, such multithreading improves processor utilization and hides the latency of long operations.

SUMMARY OF THE INVENTION

According to one aspect of one or more embodiments of the present invention, a computer system comprises an integrated circuit having a processing core fabricated therein, where the integrated circuit is configured to process a plurality of threads, and where one of the plurality of threads is assigned to the processing core dependent on an average instruction delay latency of the one of the plurality of threads.

According to another aspect of one or more embodiments of the present invention, a method of performing computer system operations comprises assigning one of a plurality of threads to a processing core fabricated on an integrated circuit, the integrated circuit configured to process the plurality of threads, and where assigning the one of the plurality of threads is dependent on an average instruction delay latency of the one of the plurality of threads.

According to another aspect of one or more embodiments of the present invention, a computer system comprises: an integrated circuit; and memory comprising instructions executable on the integrated circuit, the instructions for assigning one of a plurality of threads to a processing core fabricated on the integrated circuit, the integrated circuit configured to process the plurality of threads, where the assigning is dependent on an average instruction delay latency of the one of the plurality of threads.

According to another aspect of one or more embodiments of the present invention, a computer network comprises: a plurality of client computer systems; and a server computer system operatively connected to the plurality of client computer systems over a network, the server comprising an integrated circuit having a processing core fabricated therein, the integrated circuit configured to process multiple threads for the plurality of client computer systems, where each of the multiple threads is selectively assigned for processing to the processing core dependent on an average instruction delay latency of each of the multiple threads.

According to another aspect of one or more embodiments of the present invention, a method of performing computer network operations comprises: instantiating multiple threads for a plurality of client computer systems; and processing the multiple threads, wherein the processing comprises substantially balancing loads of threads assigned to each of a plurality of processing cores fabricated on a single integrated circuit, wherein the substantially balancing is dependent on average instruction delay latencies of the multiple threads.

Other aspects and advantages of the invention will be apparent from the following description and the appended claims.

BRIEF DESCRIPTION OF DRAWINGS

FIG. 11 shows an exemplary assignment of threads in a chip multithreading processor in accordance with an embodiment of the present invention with respect to an assignment of threads not in accordance with an embodiment of the present invention.

DETAILED DESCRIPTION

Figure 1:
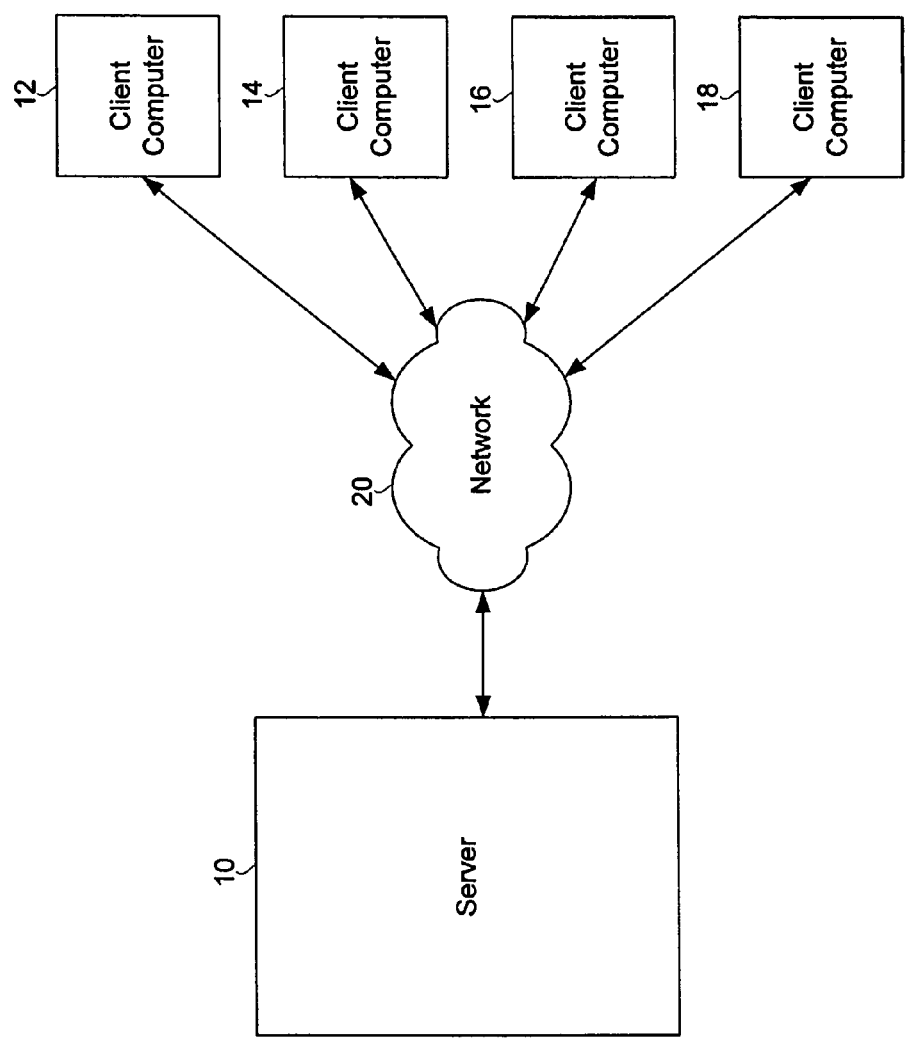
FIG. 1 shows a computer network.
Figure 2:
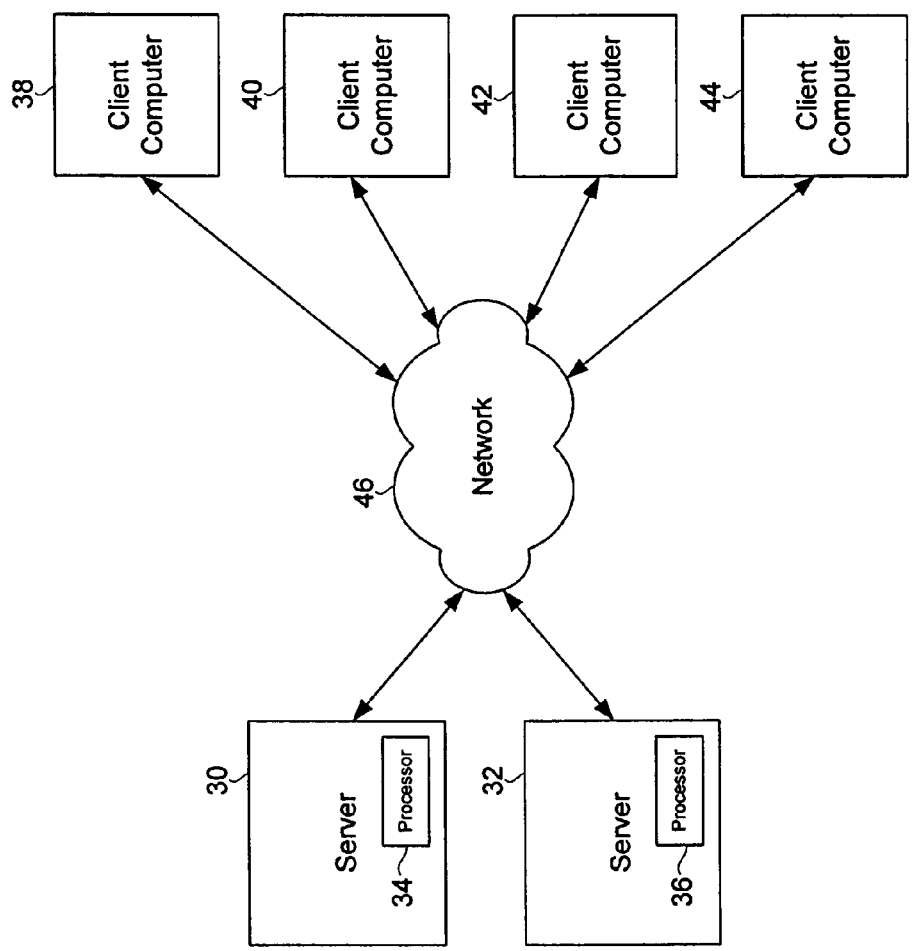
FIG. 2 shows a type of computer network.
Figure 3:
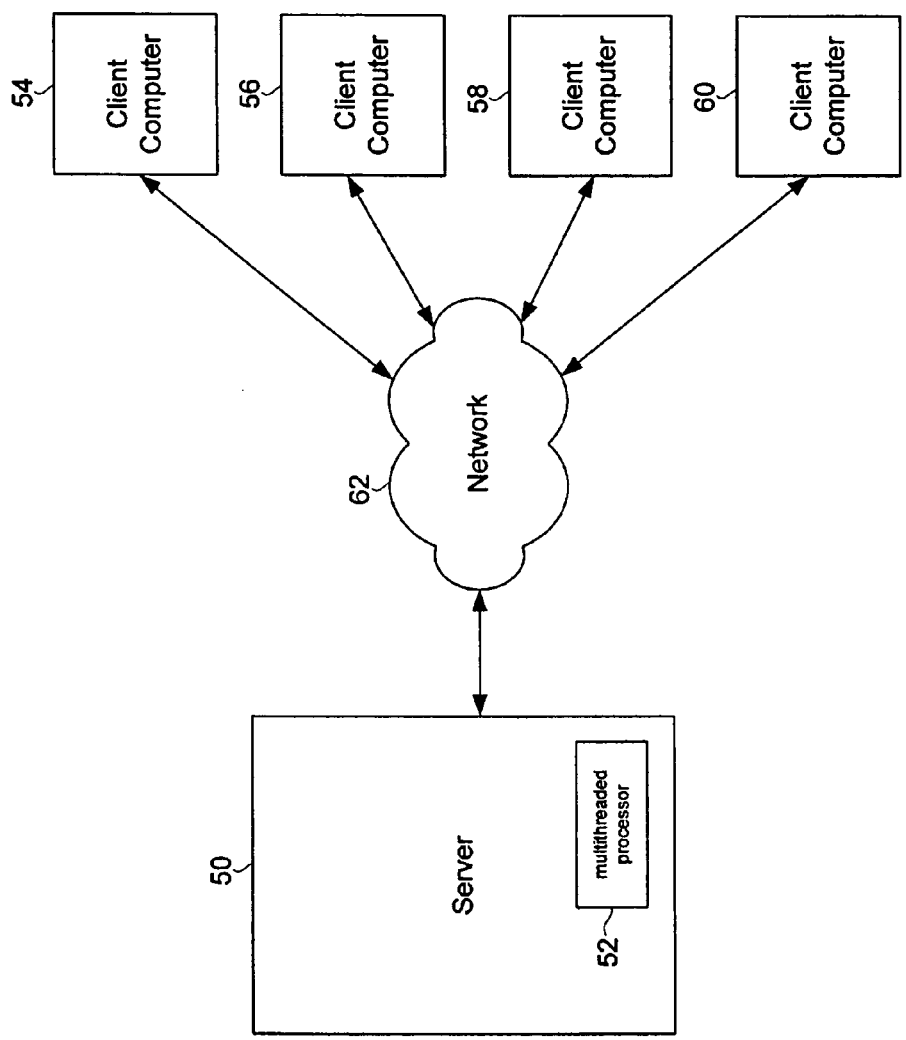
FIG. 3 shows a type of computer network.
Figure 4:
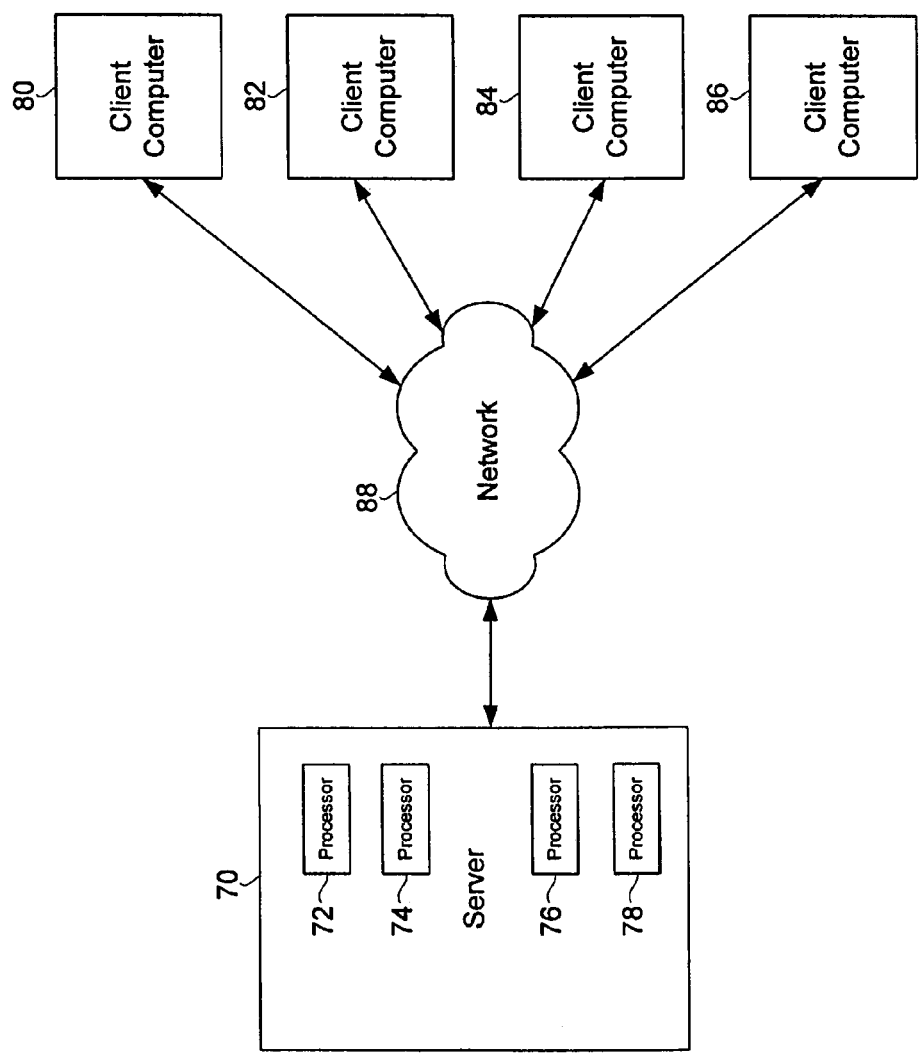
FIG. 4 shows a type of computer network.
Figure 5:
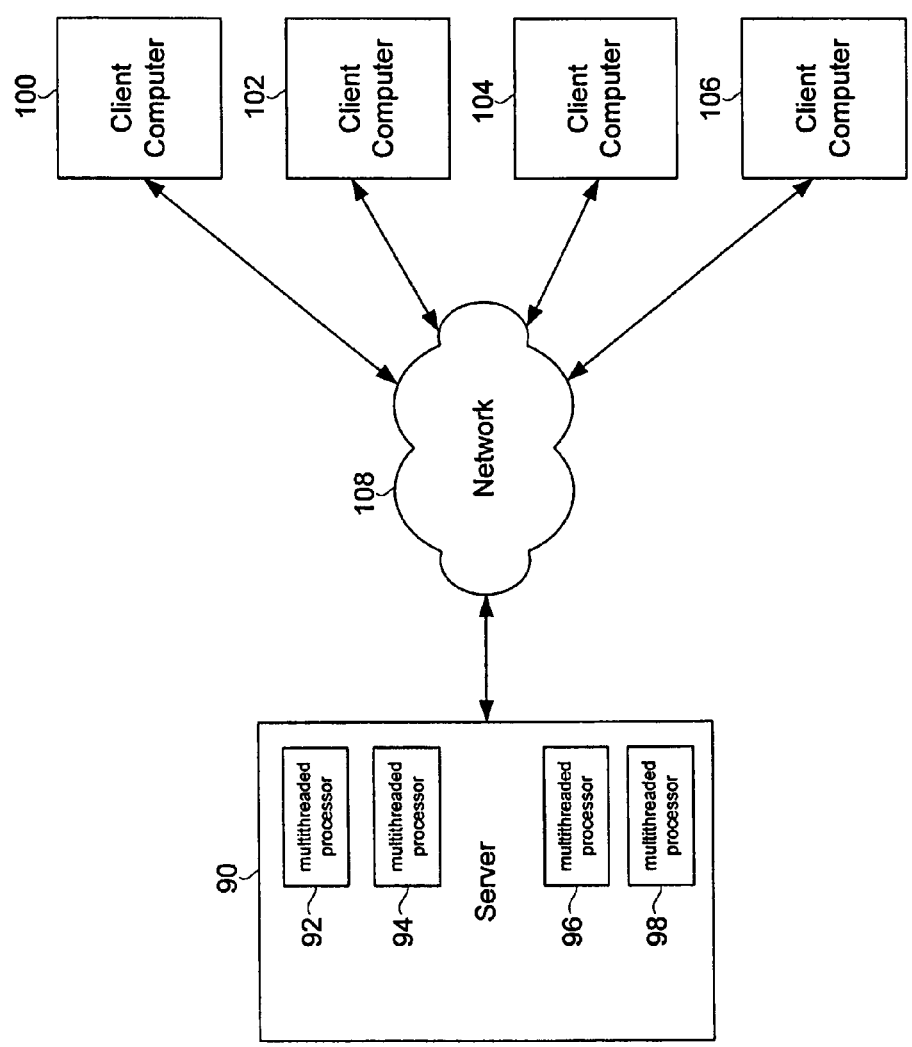
FIG. 5 shows a type of computer network.
Figure 6:
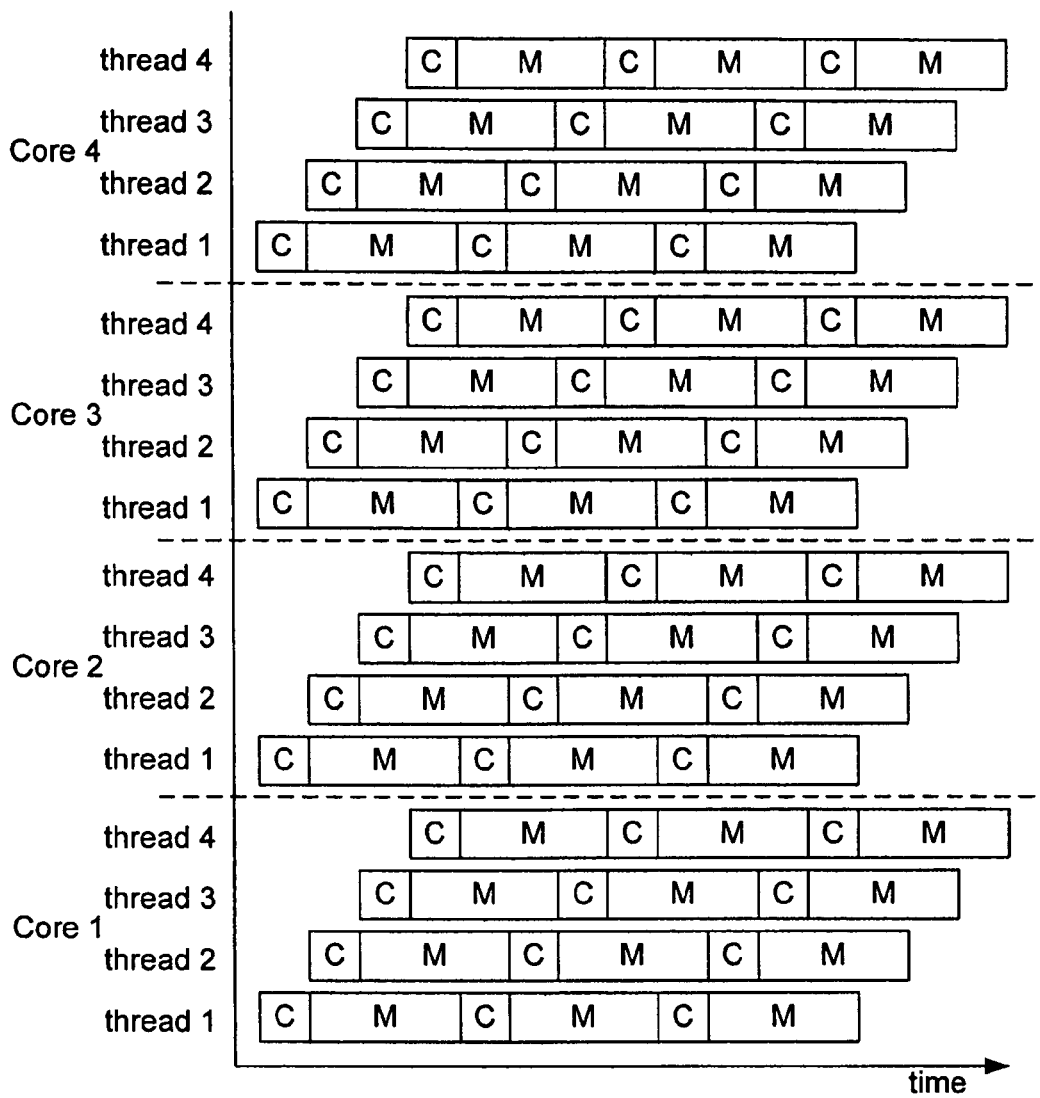
FIG. 6 shows a representation of thread execution in a chip multithreading processor.
Figure 7:
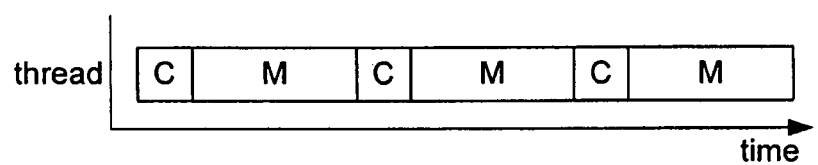
FIG. 7 shows a representation of thread execution in a single-threaded processor.
Figure 8:
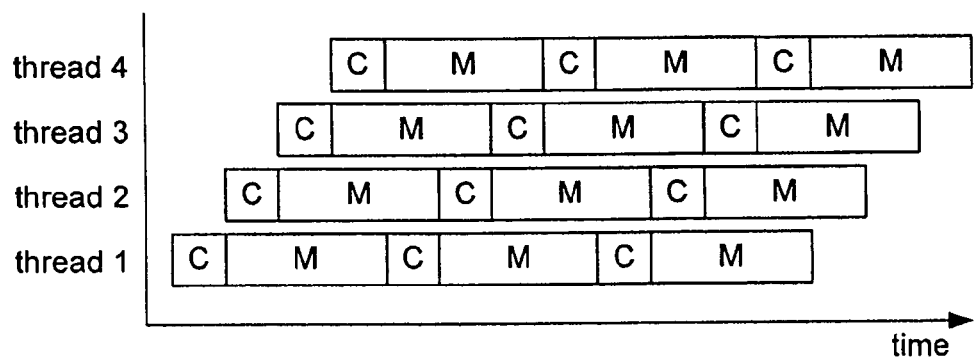
FIG. 8 shows a representation of thread execution in a processor having a single multithreaded processing core.

An exemplary processor in accordance with one or more embodiments of the present invention is formed of one or more processing cores, each being configured to execute multiple threads. Such a processor is referred to as a "chip multithreading" processor. Thus, a chip multithreading processor has one or more processing cores fabricated on a single piece of silicon, where each processing core is configured to execute multiple threads as shown in FIG. 6 (showing the processing of 16 threads by a single chip multithreading processor versus (i) the processing of one thread in a single-threaded processor as shown in FIG. 7 and (ii) the processing of multiple threads in a processor having a single multi-threaded processing core as shown in FIG. 8, where C represents a short-latency event and M represents a long-latency event).

Those skilled in the art will note that memory speeds have been increasing at a slower rate than processor speeds. Thus, typical processors may be stalled for relatively long times as they wait for data from memory. In a chip multithreading processor, when a thread must wait for a response from memory, the corresponding processing core may start processing another thread. Those skilled in the art will further note that such chip multithreading processors may be useful in thread-rich networking environments.

One factor to be considered in the design of a processor having multiple hardware contexts, such as with a chip mul- tithreading processor, is operating system scheduling. Although a scheduling technique or scheduler design for a processor having a processing core may be applied to assign threads in a chip multithreading processor, one or more embodiments of the present invention relate to an improved scheduling technique (or scheduler) for assigning threads in a chip multithreading processor.

An ideal scheduler will assign threads to processing cores in a chip multithreading processor in a way that minimizes resource contention and maximizes throughput. The scheduler should be designed with an understanding how scheduling decisions will affect resource contention because resource contention ultimately determines performance.

In a chip multithreading processor, when assigning threads to hardware contexts, a determination has to be made as to which threads should be assigned concurrently to a processing core and which threads should be run separately (e.g., in different processing cores). The optimal thread assignment should result in relatively high utilization of the chip multithreading processor.

The design of a scheduler to find good thread assignments requires an understanding of the causes and effects of resource contention among the threads that share a processing core. The mix of different types of instructions in a particular workload is an important factor in determining the level of contention for a processing core. Recall from above that when a thread performs a long-latency operation, the thread is blocked (i.e., the thread must wait for some event (e.g., a memory load) before execution can continue). Such delay is referred to as "instruction delay latency." Subsequent instructions to be issued by that thread are delayed until the blocked operation completes.

Processing core contention depends on the latencies of the instructions that the workload executes. If a thread is running a workload dominated by instructions with long delay latencies such as, for example, memory loads, functional units may go unused, thereby leaving ample opportunities for other threads to use the functional units. Resource contention, in the case, is relatively low.

Alternatively, if a thread is running a workload formed mainly of short-latency instructions, the thread may keep the processing core relatively busy as compared to with a workload formed mainly of long-latency instructions. Thus, the performance of other threads co-scheduled with this thread accordingly suffers because resource contention, in this case, is relatively high.

Figure 9:
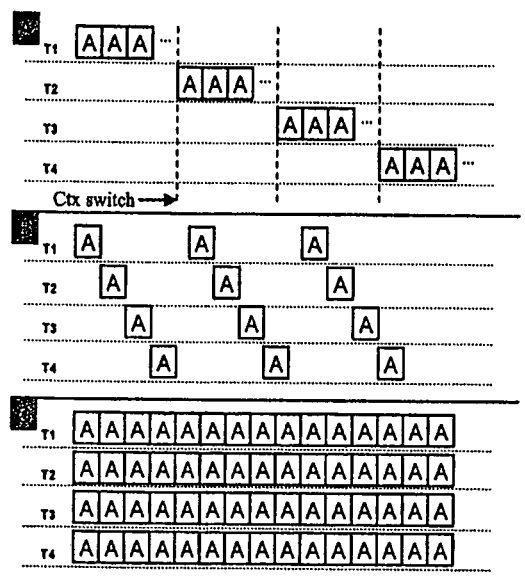
FIG. 9 shows exemplary executions of threads having relatively short-latency.

To assess the severity of resource contention with short-latency and long-latency workloads, it is useful to compare how each of these types of workloads perform on (i) a single-threaded processor, (ii) a processor having a single multi-threading processing core, and (iii) a multiprocessor system. FIG. 9 shows the processing of a short-latency workload having four threads with instructions having a delay latency of zero cycles on: system A, a single-threaded processor; system B, a multithreaded processor having four hardware contexts; and system C, a multiprocessor system having four processors. When running the short-latency workload, systems A and B perform comparably, and system C has a throughput four times greater than systems A and B because system C has four times as many as functional units as do systems A and B.

Figure 10:
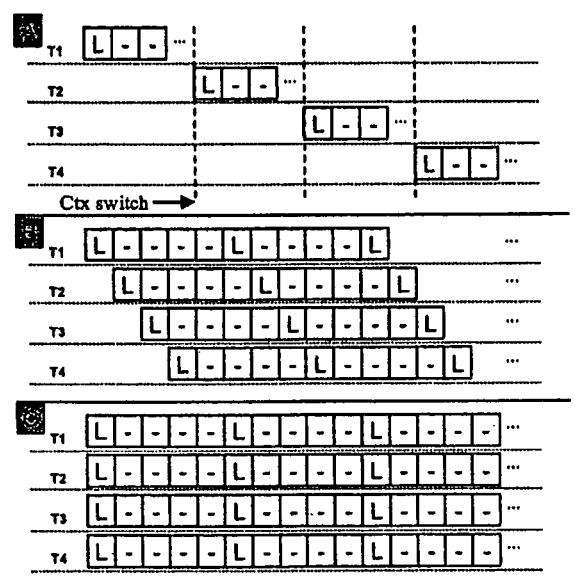
FIG. 10 shows exemplary executions of threads having relatively long-latency.

FIG. 10 shows the processing of a long-latency workload having four threads with instructions each having a delay latency of four cycles on: system A, a single-threaded processor; system B, a multithreaded processor having four hardware contexts; and system C, a multiprocessor system having four processors. When running the long-latency workload, systems B and C perform comparably, each outperforming system A by a factor of four because systems B and C are able to overlap latencies for the four threads.

Based on the observations described above with reference to FIGS. 9 and 10, it is determined that the instruction mix, and, more precisely, the average instruction delay latency, may be used as a tool for approximating processing core requirements for a particular workload. A scheduler, in accordance with one or more embodiments of the present invention, may use information pertaining to a workload's instruction mix for its scheduling decisions. Accordingly, in one or more embodiments of the present invention, a thread with an instruction mix dominated by long-latency instructions, which otherwise would leave functional units underutilized, is co-scheduled with a thread dominated by short-latency instructions and high demand for functional units.

In one or more embodiments of the present invention, the average instruction delay latency of the instructions of a particular thread is used by a scheduler to assign the thread to a processing core in a chip multithreading processor. For example, in one or more embodiments of the present invention, a scheduler may assign a thread to a processing core in a chip multithreading processor dependent on the thread's mean cycles-per-instructions (CPI). A thread's CPI may be determined by averaging the delay times (in cycles) of the executions of instructions belonging to that thread as observed if the thread were running on a single-threaded processor. Threads with relatively high CPIs have low processing core requirements because such threads spend much of their time blocked or executing long-latency instructions. Threads with relatively low CPIs have high processing core requirement because such threads spend relatively little time stalled.

In one or more embodiments of the present invention, a scheduler assigns threads to processing cores in a chip multithreading processor by substantially balancing the aggregate thread CPI of each processing core ("substantially balancing" being defined as balancing to the extent possible). FIG. 11 shows assignments of threads to a plurality of processing cores in a chip multithreading processor, where the numbers in each of the cells of FIG. 11 represent the CPIs of threads assigned to that respective processing core. The workload in each of schedules (a), (b), (c), and (d) are formed of 16 threads, four each with a CPI of 1, 6, 11, and 16.

In FIG. 11, schedules (a) and (b) represent assignments of threads to a plurality of processing cores in a chip multithreading processor which are relatively balanced as compared to schedules (c) and (d). In schedule (a), each processing core has an aggregate thread CPI of 34 (core 1: 1+6+11+16=34; core 2: 1+6+11+16=34; core 3: 1+6+11+16=34; and core 4: 1+6+11+16=34). Thus, in schedule (a), the aggregate thread CPIs of each of the processing cores is "perfectly" balanced.

In schedule (b), the aggregate thread CPIs of the processing cores range from 19 to 49 (core 1: 1+6+6+6=19; core 2: 1+6+11+11=29; core 3: 1+11+11+16=39; and core 4: 1+16+16+16=49). Thus, the assignment of threads in schedule (b) is less balanced than the assignment of threads in schedule (a).

In schedule (c), the aggregate thread CPIs of the processing cores range from 14 to 64 (core 1: 1+1+6+6=14; core 2: 1+1+6+6=14; core 3: 11+11+11+11=44; and core 4: 16+16+16+16=64). Thus, the assignment of threads in schedule (c) is less balanced than the assignment of threads in schedule (b).

In schedule (d), the aggregate thread CPIs of the processing cores range from 4 to 64 (core 1: 1+1+1+1=4; core 2: 6+6+6+6=24; core 3: 11+11+11+11=44; and core 4: 16+16+16+16=64). Thus, the assignment of threads in schedule (d) is less balanced than the assignment of threads in schedule (c).

The assignments of threads in schedules (a) and (b), which are better balanced than the assignments of threads in schedules (c) and (d), perform better than the assignments of threads in schedules (c) and (d) because, in schedules (a) and (b), threads with low resource requirements (i.e., with high thread CPIs) are scheduled together (i.e., co-scheduled) with threads with high resource requirements (i.e., with low CPIs). On the other hand, in schedules (c) and (d), there are two processing cores each running multiple threads with a CPI of 1. These processing cores are fully utilized, while other processing cores in schedules (c) and (d) are underutilized.

Accordingly, as described above with reference to FIG. 11, in one or more embodiments of the present invention, a scheduler attempts to substantially balance thread loads across processing cores in a chip multithreading processor based on CPI information relating to each thread.

In one or more other embodiments of the present invention, average CPIs of threads assigned to each of a plurality of processing cores in a chip multithreading processor may be used for thread scheduling. For example, in FIG. 11, in schedule (a), each processing core has an average thread CPI of 8.5 (core 1: (1+6+11+16)/4=8.5; core 2: (1+6+11+16)/4=8.5; core 3: (1+6+11+16)/4=8.5; and core 4: (1+6+11+16)/4=8.5). Thus, in schedule (a), the average thread CPIs of each of the processing cores is "perfectly" balanced.

In schedule (b), the average thread CPIs of the processing cores range from 4.75 to 12.25 (core 1: (1+6+6+6)/4=4.75; core 2: (1+6+11+11)/4=7.25; core 3: (1+11+11+16)/4=9.75; and core 4: (1+16+16+16)/4=12.25). Thus, the assignment of threads in schedule (b) is less balanced than the assignment of threads in schedule (a).

In schedule (c), the average thread CPIs of the processing cores range from 3.5 to 16 (core 1: (1+1+6+6)/4=3.5; core 2: (1+1+6+6)/4=3.5; core 3: (11+11+11+11)/4=11; and core 4: (16+16+16+16)/4=16). Thus, the assignment of threads in schedule (c) is less balanced than the assignment of threads in schedule (b).

In schedule (d), the average thread CPIs of the processing cores range from 1 to 16 (core 1: (1+1+1+1)/4=1; core 2: (6+6+6+6)/4=6; core 3: (11+11+11+11)/4=11; and core 4: (16+16+16+16)/4=16). Thus, the assignment of threads in schedule (d) is less balanced than the assignment of threads in schedule (c).

Accordingly, the average thread CPIs in schedules (a) and (b) are better balanced than the average thread CPIs in schedules (c) and (d); thus, the assignment of threads in schedules (a) and (b) results in better performance than with the assignment of threads in schedules (c) and (d).

Advantages of the present invention may include one or more of the following. In one or more embodiments of the present invention, a scheduler that selectively assigns threads to processing cores in a chip multithreading processor may help improve throughput through the chip multithreading processor.

In one or more embodiments of the present invention, because a scheduler assigns threads to processing cores in a chip multithreading processor dependent on CPIs of the threads, overall utilization of the resources of the processing cores may be improved.

In one or more embodiments of the present invention, because a scheduler that assigns threads to processing cores in a chip multithreading processor may help improve throughput through the chip multithreading processor, a likelihood of a thread being immediately processed upon becoming available may be increased.

In one or more embodiments of the present invention, because a scheduler attempts to substantially balance the thread loads among a set of processing cores, overall utilization of the resources of the processing cores may be improved.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
   an integrated circuit having first and second processing cores fabricated therein, wherein the integrated circuit is configured to process a plurality of threads,
      wherein a subset of the plurality of threads is assigned to the first processing core based on a pre-determined criterion dependent on a sum of a plurality of predicted delay time periods each corresponding to a single thread in the subset,
      wherein each of the plurality of predicted delay time periods is determined by a model simulating execution of the single thread on a simulated single-threaded processor that executes the single thread to completion without concurrent execution of another thread, and
      wherein each of the plurality of predicted delay time periods comprises an amount of time of the execution of the single thread during which functional units of the simulated single-threaded processor are unused awaiting completion of a memory access event initiated by the single thread; and
   memory comprising instructions to:
      assign the plurality of threads to the first and second processing cores of the integrated circuit;
      determine a first average predicted delay time based on the sum by the model simulating execution of all threads assigned to the first processing core on the simulated single-threaded processor; and
      determine a second average predicted delay time by the model simulating execution of all threads assigned to the second processing core on the simulated single-threaded processor,
      wherein a first difference is minimized between the first average delay time and the second average delay time.

2. The computer system of claim 1, wherein one of the multiple threads is incrementally assigned to the first processing core dependent on an aggregate predicted delay time based on the sum and an additional predicted delay time period corresponding to the one of the multiple threads, wherein the thread is separate from the subset already assigned to the first processing core.

3. The computer system of claim 1, further comprising:
   wherein the memory further comprising instructions to:
      determine a first aggregate predicted delay time, comprising the sum, by the model simulating execution of all threads assigned to the first processing core on the simulated single-threaded processor; and
      determine a second aggregate predicted delay time by the model simulating execution of all threads assigned to the second processing core on the simulated single-threaded processor,
      wherein a second difference is minimized between the first aggregate predicted delay time and the second aggregate predicted delay time.

4. The computer system of claim 1, wherein one of the multiple threads is incrementally assigned to the first processing core dependent on an average predicted delay time based on the sum and an additional predicted delay time period corresponding to the one of the multiple threads, wherein the one of the multiple threads is separate from the subset already assigned to the first processing core.

5. A method of performing computer system operations, comprising:
   assigning, for concurrent execution, a subset of a plurality of threads to one of first and second processing cores fabricated on an integrated circuit configured to process the plurality of threads,
      wherein assigning the subset of the plurality of threads for concurrent execution is based on a pre-determined criterion dependent on a sum of a plurality of predicted delay time periods each corresponding to a single thread in the subset,
      wherein each of the plurality of predicted delay time periods is determined by a model simulating execution of the thread on a simulated single-threaded processor that executes the thread to completion without concurrent execution of another thread, and
      wherein each of the plurality of predicted delay time periods comprises an amount of time of the execution of the single thread during which functional units of the simulated single-threaded processor are unused awaiting completion of a memory access event initiated by the single thread;
   assigning the plurality of threads to the first and second processing cores of the integrated circuit;
   determining a first average predicted delay time based on the sum by the model simulating execution of all threads assigned to the first processing core on the simulated single-threaded processor; and
   determining a second average predicted delay time by the model simulating execution of all threads assigned to the second processing core on the simulated single-threaded processor,
   wherein a difference is minimized between the first average delay time and the second average delay time.

6. The method of claim 5, further comprising:
   assigning the plurality of threads to the first and second processing cores;
   determining a first aggregate predicted delay time, comprising the sum, by the model simulating execution of all threads assigned to the first processing core on the simulated single-threaded processor; and
   determining a second aggregate predicted delay time by the model simulating execution of all threads assigned to the second processing core on the simulated single-threaded processor,
   wherein a difference is minimized between the first aggregate predicted delay time and the second aggregate predicted delay time.

7. A computer system, comprising:
   an integrated circuit having first and second processing cores fabricated therein, wherein the integrated circuit is configured to process a plurality of threads; and
   memory comprising instructions executable on the integrated circuit, the instructions for assigning, for concurrent execution, a subset of the plurality of threads to one of the first and second processing cores based on a pre-determined criterion dependent on a sum of a plurality of predicted delay time periods each corresponding to a single thread in the subset, wherein each of the plurality of predicted delay time periods is determined by a model simulating execution of the single thread on a simulated single-threaded processor that executes the single thread to completion without concurrent execution of another thread, wherein each of the plurality of predicted delay time periods comprises an amount of time of the execution of the single thread during which functional units of the simulated single-threaded processor are unused awaiting completion of a memory access event initiated by the single thread, wherein the instructions for assigning comprise instructions for:
  assigning the plurality of threads to the first and second processing cores;
  determining a first aggregate predicted delay time, comprising the sum, by the model simulating execution of all threads assigned to the first processing core on the simulated single-threaded processor; and
  determining a second aggregate predicted delay time by the model simulating execution of all threads assigned to the second processing core on the simulated single-threaded processor, wherein a first difference is minimized between the first aggregate predicted delay time and the second aggregate predicted delay time.

8. The computer system of claim 7, the instructions for assigning further comprising instructions for:

determining a first average predicted delay time based on the sum by the model simulating execution of all threads assigned to the first processing core on the simulated single-threaded processor; and determining a second average predicted delay time by the model simulating execution of all threads assigned to the second processing core on the simulated single-threaded processor, wherein a second difference is minimized between the first average delay time and the second average delay time.

9. The computer system of claim 1, wherein a first thread, of the plurality of threads and assigned to the first processing core, has a first long-latency instruction mix as determined based on a first predicted delay time of the first thread, and wherein a second thread, of the plurality of threads and assigned to the second processing core, has a first short-latency instruction mix as determined based on a second predicted delay time of the second thread;

further comprising a scheduler configured to:
  assign a third thread to the first processing core in response to the third thread having a second short-latency instruction mix as determined based on a third predicted delay time of the third thread; and
  assign a fourth thread to the second processing core in response to the fourth thread having a second long-latency instruction mix as determined based on a fourth predicted delay time of the fourth thread.

* * * * *

UNITED STATES PATENT AND TRADEMARK OFFICE
CERTIFICATE OF CORRECTION

| | | |
|---|---|---|
| PATENT NO. | : 8,539,491 B1 | |
| APPLICATION NO. | : 10/898759 | |
| DATED | : September 17, 2013 | |
| INVENTOR(S) | : Christopher A. Small et al. | |

It is certified that error appears in the above-identified patent and that said Letters Patent is hereby corrected as shown below:

On the Title Page, Item (57), in the Abstract:

"A thread scheduling technique for assigning multiple threads on a single integrated circuit" should read --A thread scheduling technique for assigning multiple threads to processing cores fabricated on a single integrated circuit--.

The word "long-latency" should read --high-latency--.

The word "short-latency" should read --low-latency--.

Signed and Sealed this
Eighth Day of July, 2014

Michelle K. Lee
*Deputy Director of the United States Patent and Trademark Office*